US009467575B2

(12) United States Patent
Rivera et al.

(10) Patent No.: US 9,467,575 B2
(45) Date of Patent: Oct. 11, 2016

(54) SYSTEM AND PROCESS FOR SELECTIVE METERING OF DATA USAGE FOR A WIRELESS NETWORK

(71) Applicant: TracFone Wireless, Inc., Miami, FL (US)

(72) Inventors: Sergio Rivera, Miami, FL (US); Satish Ramprasad, Miami, FL (US)

(73) Assignee: TracFone Wireless, Inc., Miami, FL (US)

( * ) Notice: Subject to any disclaimer, the term of this patent is extended or adjusted under 35 U.S.C. 154(b) by 0 days.

(21) Appl. No.: 14/720,211

(22) Filed: May 22, 2015

(65) Prior Publication Data

US 2015/0341505 A1 Nov. 26, 2015

Related U.S. Application Data

(60) Provisional application No. 62/001,847, filed on May 22, 2014.

(51) Int. Cl.
*H04M 11/00* (2006.01)
*H04M 15/00* (2006.01)

(52) U.S. Cl.
CPC ......... *H04M 15/8214* (2013.01); *H04M 15/00* (2013.01); *H04M 15/58* (2013.01); *H04M 15/8083* (2013.01)

(58) Field of Classification Search
CPC .................. H04M 15/8214; H04M 15/8083; H04M 15/58
USPC ....... 455/406, 522, 404.2, 418, 408; 705/34, 705/14.43, 1.1, 26.1
See application file for complete search history.

(56) References Cited

U.S. PATENT DOCUMENTS

| 8,996,485 B1* | 3/2015 | Krishnamurthy | G06F 21/30 707/705 |
| 2004/0125781 A1* | 7/2004 | Walter | H04L 12/14 370/338 |
| 2008/0215468 A1* | 9/2008 | Monsa-Chermon | G06Q 10/00 705/34 |
| 2014/0379539 A1* | 12/2014 | Doddavula | G06Q 20/145 705/34 |

OTHER PUBLICATIONS

"Much More Than a Sim. A ChatSim", http://www.chatsim.com/en Jun. 5, 2015.
"WhatSim is Here! The First Whats App Sim that Makes you Chat with WhatsApp Absolutely Free of Charge and With no Limits. Even without Wi-Fi Connection", http://www.prnewswire.com/news-releases/whatsim-is-here-the-first-whatsapp-sim-that-ma . . . Jun. 5, 2015.
"The More We Connect, the Better it Gets", https://internet.org Jun. 5, 2015.

* cited by examiner

*Primary Examiner* — Dhaval Patel
(74) *Attorney, Agent, or Firm* — Baker & Hostetler LLP

(57) ABSTRACT

A device, system, and process of metering data usage of a wireless device includes receiving a request for data usage of a web resource by the wireless device, determining if the web resource corresponds to at least one entry in a database, allowing access to the web resource by the wireless device, and tracking data usage of the web resource by the wireless device. The metering data usage of the web resource by the wireless device based on information contained in the database and the metering data usage of the web resource by the wireless device further includes not metering all data usage with respect to a user's plan if the database indicates the web resource is associated with specialized metering parameters.

20 Claims, 5 Drawing Sheets

SYSTEM AND PROCESS FOR SELECTIVE METERING OF DATA USAGE FOR A WIRELESS NETWORK

CROSS REFERENCE TO PRIOR APPLICATIONS

This application claims the benefit from U.S. Provisional Application No. 62/001,847 filed on May 22, 2014, which is hereby incorporated by reference for all purposes as if fully set forth herein.

BACKGROUND OF THE DISCLOSURE

1. Field of the Disclosure

This disclosure relates generally to a process and system for implementing a wireless network with the ability to selectively meter data usage by users differently based on the web site, server, or other web resource that a user accesses. More specifically, the disclosure relates generally to a process and system for implementing a wireless network with the ability to selectively meter data usage by users in order to drive user traffic to access desired websites for advertising, revenue, and the like.

2. Related Art

Mobile phones and other wireless devices are quickly becoming one of the most popular means for people to connect to the Internet. Mobile phone users who access the Internet do so through use of a data plan. However, data plans can be expensive and lack flexibility. Accordingly, some mobile phone users may only be interested in visiting a limited number websites or consuming data on a limited number of applications.

Currently, some mobile phone users access the Internet through ongoing contracts with a Mobile Network Operator (MNO). In these postpaid plans, mobile users pay a substantial rate per month for data usage in order to have general Internet access.

Other mobile phone users access the Internet using a "prepaid plan." Prepaid plans can be provided to users through a Mobile Virtual Network Operator (MVNO). A MVNO is a mobile operator that typically does not own its own frequency spectrum or have its own network infrastructure. Instead, the MVNOs have business arrangements and contracts with MNOs to purchase data and phone usage of their networks. The MVNOs then allow users to purchase fixed amounts of data and phone usage.

The MVNOs can offer prepaid data plans to their users in a variety of ways. One way is payment for a specific amount of data usage. For example, a user may pay $20 upfront for 300 MB of data usage. The MVNO will then permit the user to access services until the subscriber payment is exhausted. This way, the service provider avoids nonpayment risks and the subscriber caps the total amount spent on network services. Another possible payment plan for prepaid data usage can be payment for a specified amount of time. For example, instead of paying for a fixed amount of data, a user could pay $20 for 300 minutes of Internet connection.

These prepaid plans are popular among some users because they do not require an ongoing contract with the MVNO. The prepaid plans offer monetary incentives to some users because they are only charged for the amount they have used. Users who do not have high data usage may save money by not having to subscribe to a more expensive large volume data plan or an unlimited data plan.

However, both post-paid and prepaid plans lack flexibility to provide reduced cost for data usage to users. Not all users may wish to pay for general Internet access. Moreover, MNOs and MVNOs may find it beneficial to encourage users to access particular web resources. Accordingly, there is a need for a system where a mobile network can charge users of a data plan differently based on the website or server they access.

SUMMARY OF THE INVENTION

The foregoing needs are met, to a great extent, by the invention, with a process and system for implementing a wireless network that can selectively meter data usage of wireless devices. Some wireless device users may benefit and/or desire a wireless network that can selectively meter data because it allows them an option to access a limited number of websites for a reduced cost. Furthermore, the network operators may also have incentives to provide certain web resources, websites, or applications to their users free of cost or at a reduced cost. The network operators may wish to drive traffic to particular web resources, websites, applications, or the like, for advertising or the like. The network operators may also wish to drive users to particular web content because of contracts with the content providers.

In one or more aspects, a process of receiving a request for data usage of a web resource includes determining if the web resource corresponds to one or more entries in a database, allowing access to the web resource, tracking a usage of the web resource, and metering the usage of the web resource based on information contained in the database.

In one or more aspects, a wireless network system configured to meter data usage of a wireless device includes a metering system configured to receive a request for data usage of a web resource, a metering system further configured to determine if the web resource corresponds to one or more entries in a database, the metering system further configured to allow access to the web resource, the metering system further configured to track a usage of the web resource, and the metering system further configured to meter the usage of the web resource based on information contained in the database.

In one or more aspects, a computer-readable medium includes contents that are configured to cause a computing system to meter data usage by performing a method that includes receiving a request for data usage of a web resource, determining if the web resource corresponds to one or more entries in a database, allowing access to the web resource, tracking a usage of the web resource, and metering the usage of the web resource based on information contained in the database.

There has thus been outlined, rather broadly, certain aspects of the invention in order that the detailed description thereof herein may be better understood, and in order that the detailed description thereof herein may be better understood, and in order that the present contribution to the art may be better appreciated. There are, of course, additional aspects of the invention that will be described below and which will form the subject matter of the claims appended hereto.

In this respect, before explaining at least one aspect of the invention in detail, it is to be understood that the invention is not limited in its application to the details of construction and to the arrangements of the components set forth in the following description or illustrated in the drawings. The invention is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the invention. It is important, therefore, that the claims be regarded as including such equivalent constructions insofar as they do not depart from the spirit and scope of the invention.

DETAILED DESCRIPTION

Reference in this specification to a "wireless device" is intended to encompass any compatible mobile technology computing device that connects to a wireless communication network, such as mobile phones, mobile equipment, mobile stations, user equipment, cellular phones, smartphones, handsets or the like (e.g., Apple iPhone, iPad, Google Android based devices, BlackBerry based devices, other types of PDAs or smartphones), wireless dongles, or other mobile computing devices. The term "wireless device" may be interchangeably used and referred to herein as "wireless handset," "handset," "mobile device," "device," "mobile phones," "mobile equipment," "mobile station," "user equipment," "cellular phone," "smartphones," or "phone." Further, reference in this specification to a "wireless network" or "network" is intended to encompass any type of wireless network from which a MVNO or MNO uses to provide mobile phone services to a wireless device utilizing a communication channel, such as the Global System for Mobile Communication (GSM) network, Code-Division Multiple Access (CDMA) network, Long Term Evolution (LTE), 5G (5th generation mobile networks/wireless systems), EVolution-Data Optimized (EVDO), or the like, that may utilize the teachings of the present application to allow a wireless device to connect to a wireless network.

Reference in this specification to "one aspect," "an aspect," "other aspects," "one or more aspects," or the like means that a particular feature, structure, or characteristic described in connection with the aspect is included in at least one aspect of the disclosure. The appearance of for example, "in one aspect" in various places in the specification are not necessarily all referring to the same aspect, nor are separate or alternative aspects mutually exclusive of other aspects. Moreover, various features are described which may be exhibited by some aspects and not by others. Similarly, various requirements are described which may be requirements for some aspects, but not other aspects.

Figure 1:
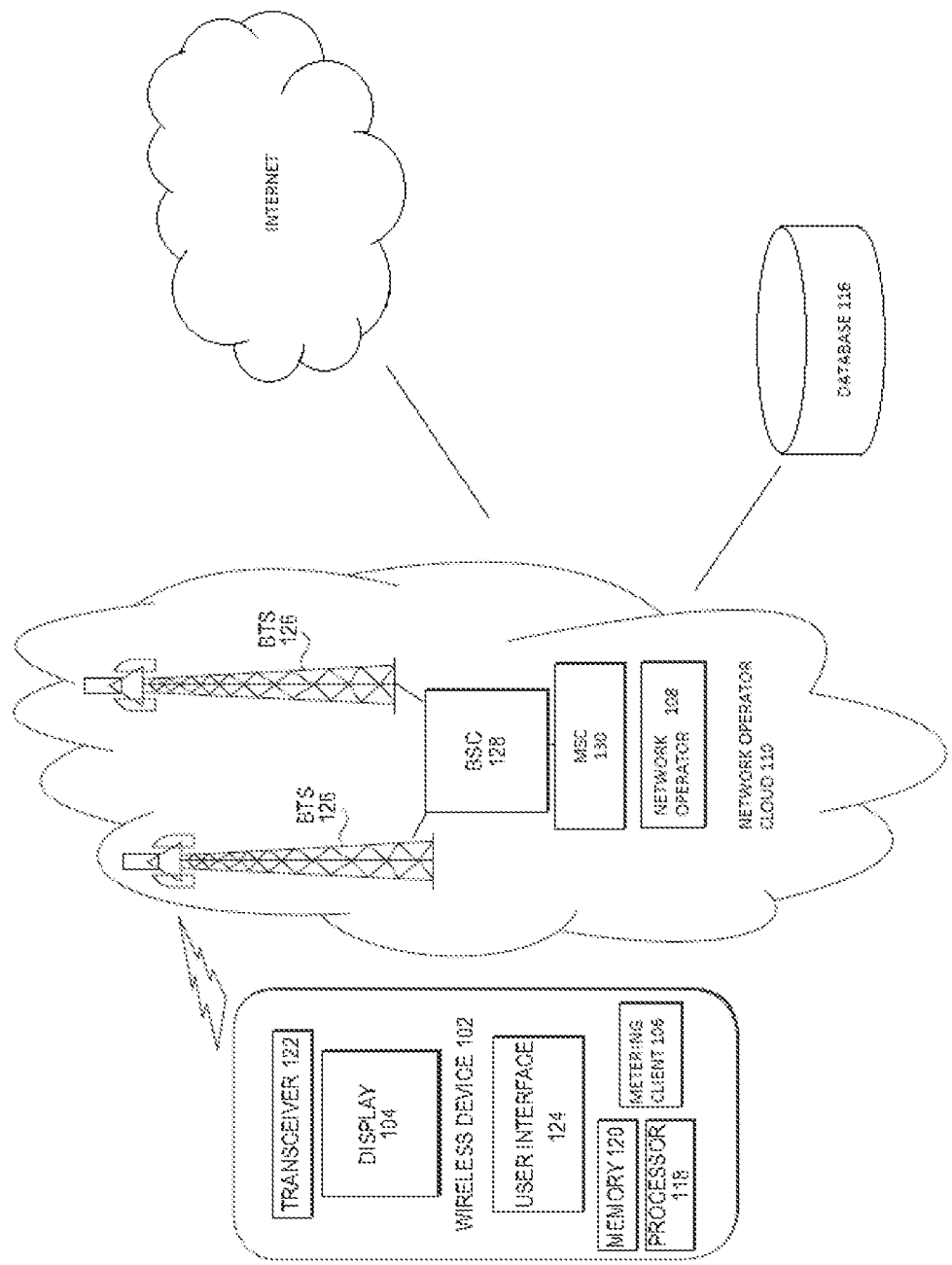
FIG. 1 shows the details of a network operator cloud, a wireless device, and a metering client located within the wireless device in accordance with aspects of the invention.

FIG. 1 shows a network operator cloud, a wireless device, and a metering client located within the wireless device in accordance with aspects of the invention. In particular, FIG. 1 shows the details of a wireless device 102, network operator cloud 110, network operator 108, database 116 of web resources, and metering client 106.

The wireless device 102 provides the radio and signal processing needed to request data usage from the network operator cloud 110 utilizing a communication channel. The wireless device 102 includes a processor 118, memory 120, transceiver 122, display 104, user interface 124, and the like that is known in the art. The processor 118 may be configured to process call functions, provide other services to the user, and may also execute any programs including the metering client 106.

FIG. 1 further shows that the network operator cloud 110 may include a Mobile services Switching Center (MSC) 130 that may perform the switching of calls. The network operator cloud 110 may also include a Base Transceiver Station (BTS) 126 and a Base Station Controller (BSC) 110. The base transceiver station 126 houses the radio transceivers that define a cell and handle the radio-link protocols with the wireless device 102. The base station controller 128 manages the radio resources for one or more base transceiver stations 126. The base station controller 110 is the connection between the wireless device 104 and the Mobile service Switching Center (MSC) 106.

The network operator 108 may be an MNO or an MVNO. The network operator cloud 110 may be implemented as a network, internet cloud, server, computer, system, distributed processing system, cloud-based system or the like.

Furthermore, FIG. 1 shows that the metering client 106 may also be stored on or execute, at least in part, on a Subscriber Identification Module (SIM) or Universal Integrated Circuit Card (UICC); on dedicated hardware including semiconductors, application specific integrated circuits (ASIC), programmable logic arrays, the processor 118; and/or other hardware devices.

This aspect of the metering client 106 may be implemented utilizing an internal accounting module to establish an account with a representation of prepaid funds or available credit. The internal accounting module may also store a plurality of charge rates and may also store a billing algorithm, which can classify each telephone call into one of a plurality of billing categories; select a charge rate corresponding to that billing category; calculate an appropriate charge for that telephone call in real time by using said selected charge rate; and apply this appropriate charge to the account. In this aspect, the metering client 106 may also include a module for one or more system provider host processors, which store mobile telephone unit identification information; store operating codes needed for mobile phone unit activation; and store operating codes needed for setting prepaid funds or available credit amounts in mobile phone unit accounts whereby, upon receipt of mobile telephone unit identification information from a particular mobile phone unit or its user, the host processor may be capable of ascertaining the operating codes needed to activate that particular mobile phone unit or needed to set its account amount. Further details of this aspect of the metering client 106 are described in U.S. Pat. No. 6,650,887, to McGregor, et al., filed Nov. 18, 2003 and incorporated by reference herein in its entirety.

The database 116 of web resources may be stored locally on the wireless device 102, may be stored on the network operator cloud 110, or the like. The database 116 may contain entries in the form of URIs, domain names, IP addresses, APIs, and other protocols. The database 116 of web resources may contain specialized metering parameters that indicate which URIs, domains, APIs, IP addresses, wireless device applications, and other web resources that are free-to-use, subject to reduced cost, or the like; i.e., the network operator 108 wants to meter data usage differently. For example, the database 116 may indicate that any requests for data usage associated with TracFone.com should be free-to-use and will not count against a user's data usage. The database 116 may also contain other specialized metering parameters for each entry that further indicates how the metering client 106 should meter data usage for a web resource, such as a parameter for a trial period or reduced cost. For example, the database 116 may contain specialized metering parameters that indicate that requests for data usage associated with TracFone.com should only count against a user's data usage after 30 minutes. As another example, the database 116 may contain specialized metering parameters that indicate that requests for data usage from TracFone.com should only be metered at one-third of the actual data usage. Of course, any specializing metering parameters, such as time, are contemplated by the invention.

Figure 2:
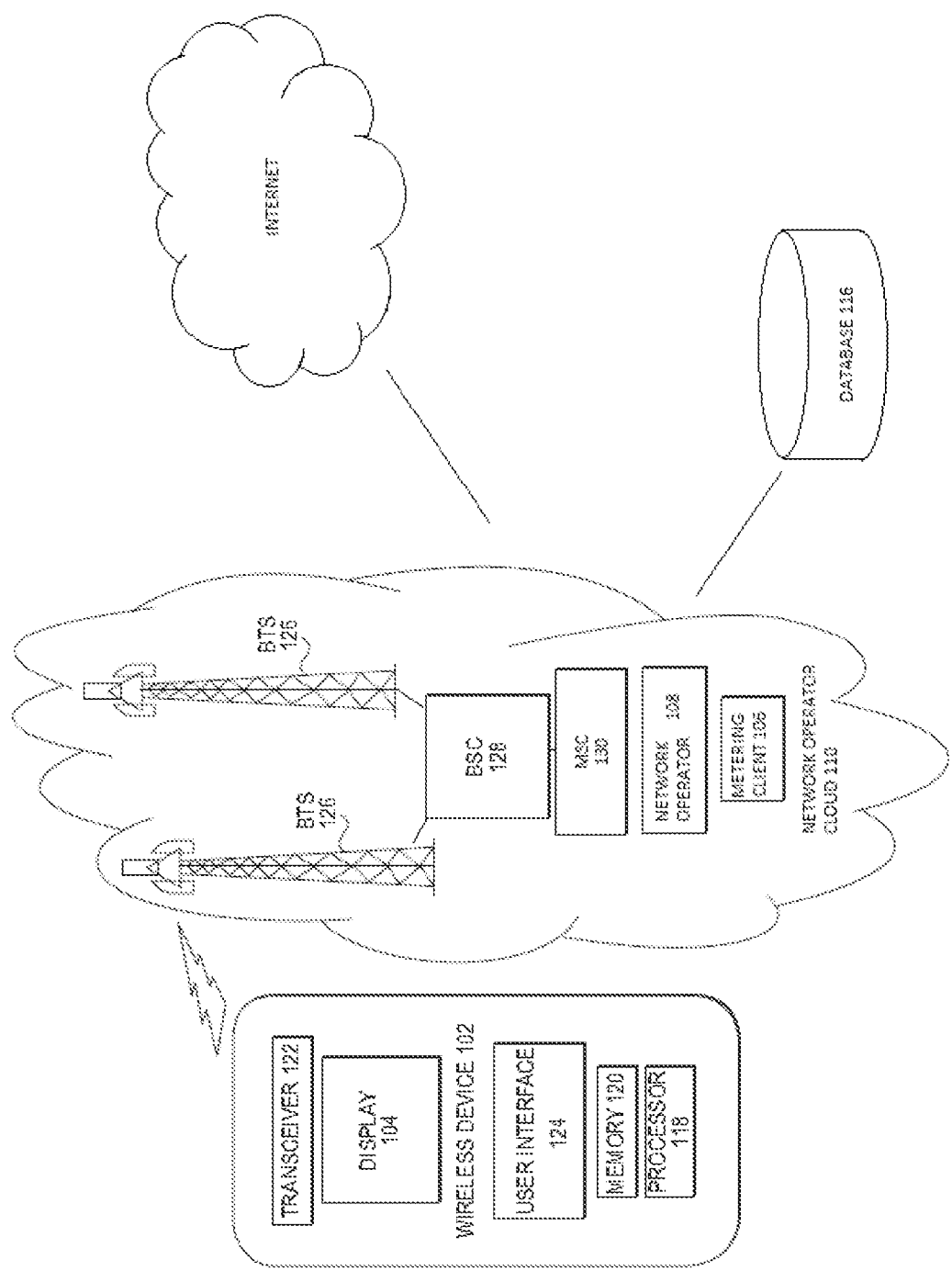
FIG. 2 shows the details of a network operator cloud, a wireless device, and a metering client located within the network operator cloud in accordance with another aspect of the invention.

FIG. 2 shows the details of a network operator cloud, a wireless device, and a metering client located within the network operator cloud in accordance with another aspect of the invention. The metering client 116 may be implemented in a Mobile Telephone Switching Office (MTSO). The MTSO may include switching equipment and/or the Mobile Switching Center (MSC) 130 for routing mobile phone calls and providing data usage. The systems in the MTSO may be configured to compile data usage and provide billing information based on the data usage. The MTSO may operate in conjunction with the CBM/SDM and the like for the billing and tracking functionality. The metering client may also be executed by the base transceiver station 126, the Base Station Controller 128, and/or another aspect of the network operator cloud 110.

Figure 3:
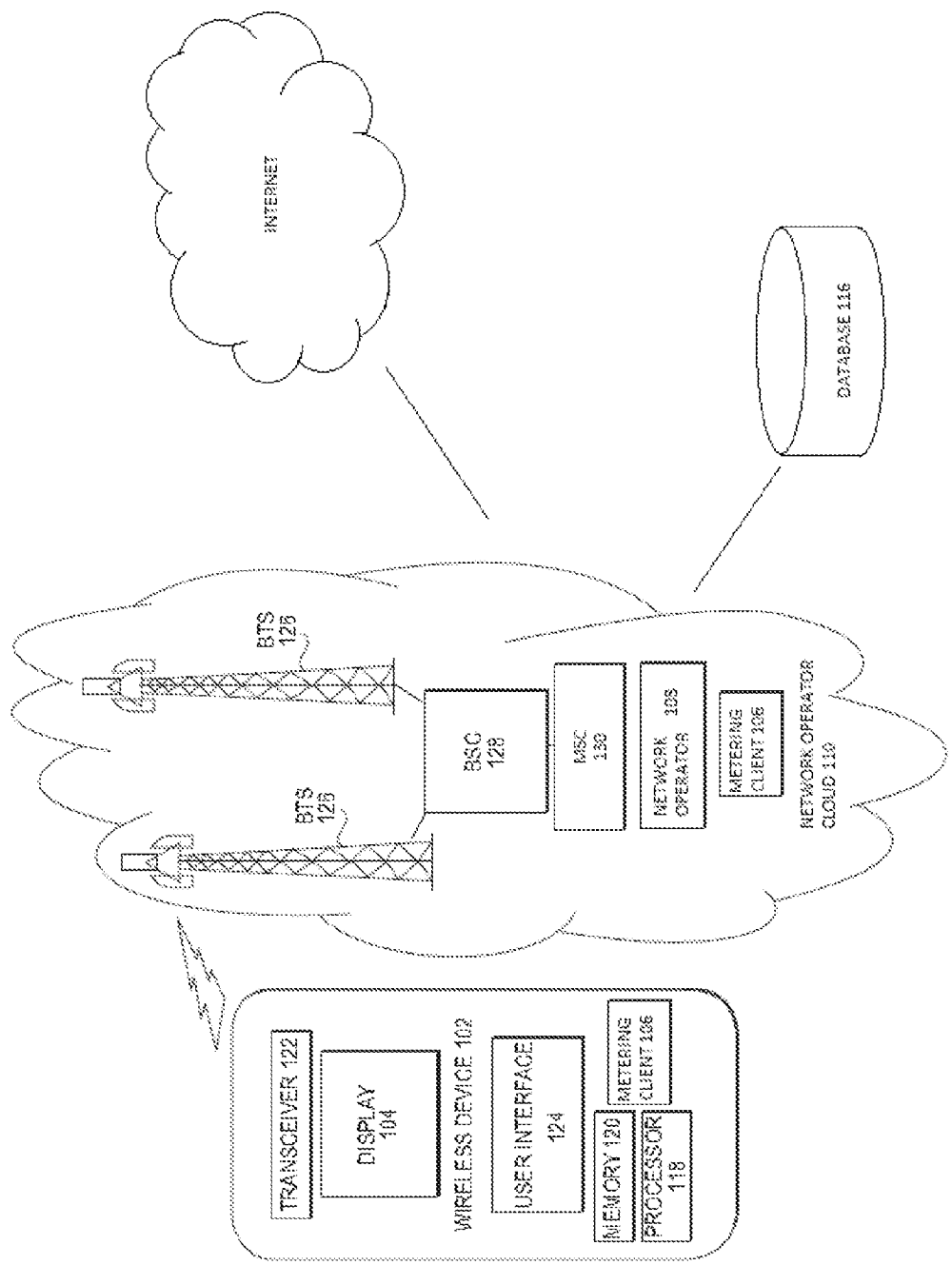
FIG. 3 shows the details of a network operator cloud, a wireless device, and a hybrid metering client located in part within the wireless device and in part within the network operator cloud in accordance with yet another aspect of the invention.

FIG. 3 shows the details of a network operator cloud, a wireless device, and a hybrid metering client located in part within the wireless device and in part within the network operator cloud in accordance with yet another aspect of the invention. The metering client 106 may execute partially or completely on the network operator cloud 110 and execute partially or completely on the wireless device 102.

Specifically, the metering client 106 may be implemented as a process capable of tracking usage of a wireless device 102 in a wireless network with a metering system implemented in the network operator cloud 110 and a tracking system implemented in a wireless device 102. The metering client 106 may be capable of activating the wireless device 102 in response to identification of the wireless device and confirmation of use of a tracking system to the metering system. The metering client 106 may be further configured to obtain by the metering system, an amount of wireless services used by the wireless device; wherein the obtaining includes at least one of obtaining an amount of wireless services used from the third party wireless network and obtaining an amount of wireless services used from the tracking system. Further details of this aspect of the metering client 106 are described in U.S. patent application Ser. No. 13/669,838, filed Nov. 6, 2012 and incorporated by reference herein in its entirety.

Figure 4:
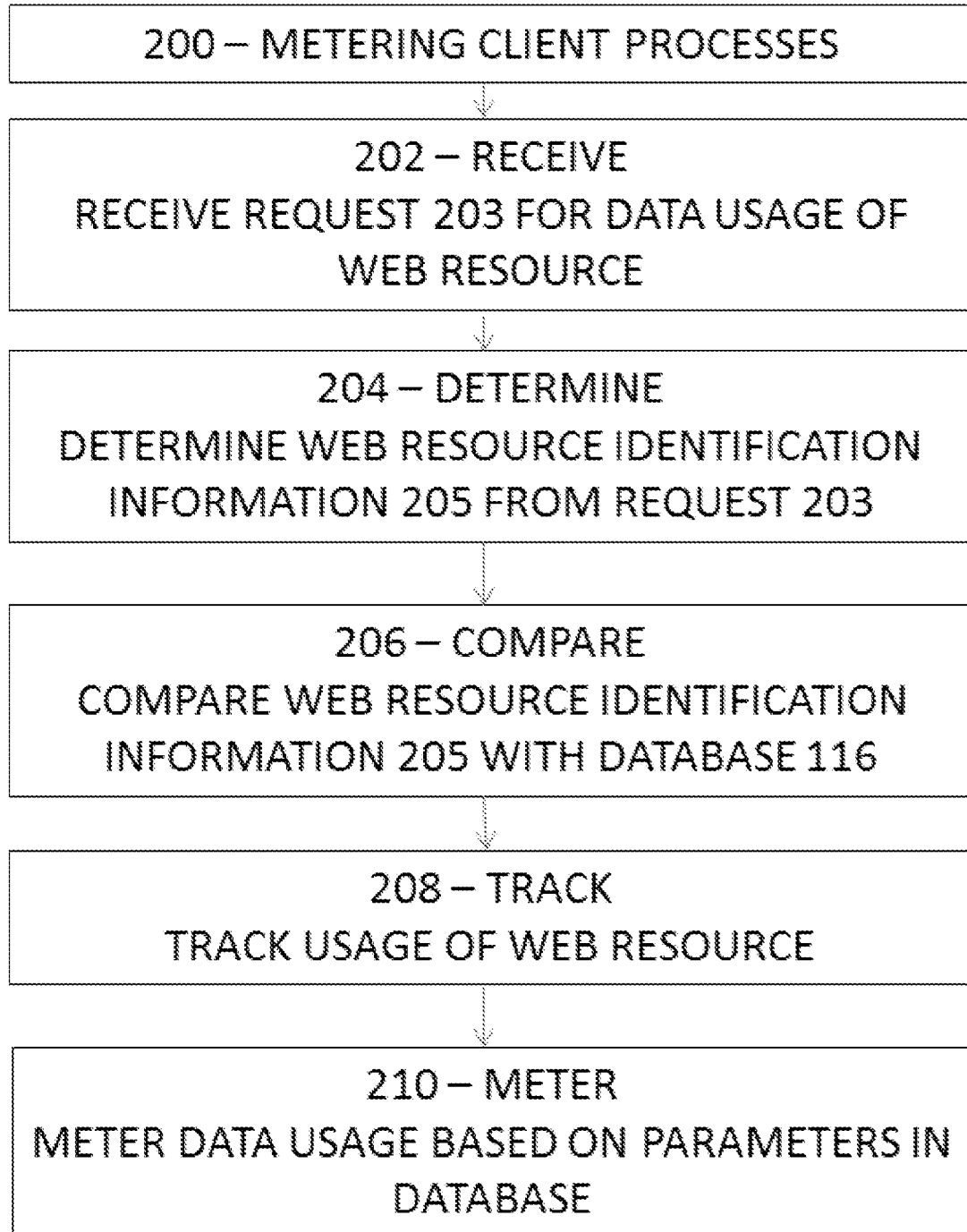
FIG. 4 shows metering client processes in accordance with aspects of the invention.

FIG. 4 shows metering client processes 200 in accordance with aspects of the invention. As described above, the metering client 116 may, in part, reside on the wireless device 102 or may be located elsewhere as noted above. In particular the metering client may implement processes to receive 202 a request 203 for data usage; implement processes to determine 204 web resource identification information 205; implement processes to compare 206 the database 116 of web resources with web resource identification information 205; implement processes to track 208 the usage of the wireless subscriber and/or wireless device; and implement processes to meter 210 the usage of the wireless services by the wireless device 102.

Receive Request

In a particular aspect of the metering client 106, the metering client 106 may receive 202 a request 203 for data usage from the wireless device 102. The request 203 for data usage may be for delivery of web resources, including web pages, audio streaming, video streaming, pictures, animations, data for wireless device applications, and the like. The request 203 from the wireless device 102 may originate from a wireless device application, a web browsing platform, other software installed on the wireless device, or the like.

Determine Web Resource Identification Information

In a further aspect of the metering client 106, the metering client 106 may determine 204 web resource identification information 205 that may be used to identify the provider of the requested web resource. This web resource identification information 205 may include an IPv4 address, an IPv6 address, any or all parts of domain name address, a Uniform Resource Identifier (URI), a Uniform Resource Locator (URL), and/or any other information that identifies the location and/or server that delivers the web resource. It should be noted that web resource is contemplated to encompass broadly any wireless data type.

In order to avoid compromising the network and/or the subscription services, the web resource information 205 provided in the request for web resources may be stored in a secure location within the network operator cloud 110 once it has been received. Additionally, the web resource identification information 205 in the request 203 for web resources may be further encrypted to avoid compromising the network and/or the subscription services.

Compare with Database

In a particular aspect of the metering client 106, the metering client 106 may compare 206 the determined web resource identification information 205 with the database 116 of web resources. The metering client 106 may translate the protocol of the web resource identification information 205 to match the protocol used to store the database of web resources, such as translating from domain name to an IP address.

Additionally, the metering client 106 may provide notification to the wireless device 102 that the received web resource identification information 205 corresponds to an entry in the database 116 of web resources. For example, the tracking process may send a network packet, SMS, email, or the like, notifying the wireless device 102 that the web resource identification information 205 corresponds to an entry.

Track Usage

In a further aspect of the metering client 106, the metering client 106 may track 208 data usage with respect to the web resource. In particular, the metering client 106 may monitor the amount of data that is sent or received by the wireless device 102 associated with the web resource. The metering client 106 may also monitor the length of time that the wireless device 102 uses the web resource. The metering client may also characterize the usage into categories that can include free-to-use, trial period, reduced data cost, web page, video streaming, audio streaming, wireless device application, or the like. Additionally, for each of the above noted services provided to the wireless device 102, the further details of how the metering client handled the services may also be tracked. Moreover, the date and time of the data usage may be tracked as well. The metering client 106 may also track any other aspect or usage of the wireless device 102 and accordingly these aspects are within the scope and spirit of the invention. This information or usage metric information that is accumulated based on the tracking of the above noted usage may then be stored in a secure location and/or stored in an encrypted manner to avoid the usage data from being compromised.

Meter Data Usage

In another aspect of the metering client 106, the metering client 106 may meter 210 data usage based on specialized metering parameters contained in the database 116. The metering client 106 may determine data usage is a free-to-use or a trial period web resource based on these specialized metering parameters. If a web-resource is free-to-use or within a trial period, the metering client 106 may not track the data usage of the web resource and not count this as data usage under the user's plan. Alternatively, if a web-resource is a reduced cost resource, the metering client 106 may calculate the adjusted amount of data usage from information retained about the amount of total data usage and the amount of reduced cost data usage.

Additionally, the metering client 106 may communicate to or display on the wireless device 102 the various metrics described above. For example, the metering client 106 may communicate to or display on the wireless device 102 the amount of data used. Similarly, the metering client 106 may also communicate to or display on the wireless device 102 the amount of data sent and received. Moreover, the metering client 106 may communicate to or display on the wireless device 102 the amount of data that may be remaining from the previously purchased and/or credited amount of data.

In another aspect of the invention, the metering client 106 may execute a modification process. In particular, the metering client may have the ability to modify the data usage for the mobile subscriber for subscribed services. Thereafter, the modification process may modify any databases associated with the wireless device 102 or network operator cloud 110 to ensure an accurate history of the web resources accessed by the wireless device 102. For example, the modification process may determine that more free-to-use data was used in the wireless device 102 than is shown in the memory of the wireless device 102. In this case, the modification process may modify the data used and/or data remaining that is stored in the wireless device 102 or the network operator cloud 110.

In another aspect of the invention, the metering client 106 may generate reports providing an accurate history of the web resources accessed by the wireless device 102 or all wireless devices associated with an MNO and/or MVNO. The reports may be used to ensure or prove that an MNO and/or MVNO is providing the specialized metering. Moreover, the reports may be used to show that an MNO and/or MVNO is driving traffic to particular web resources.

Figure 5:
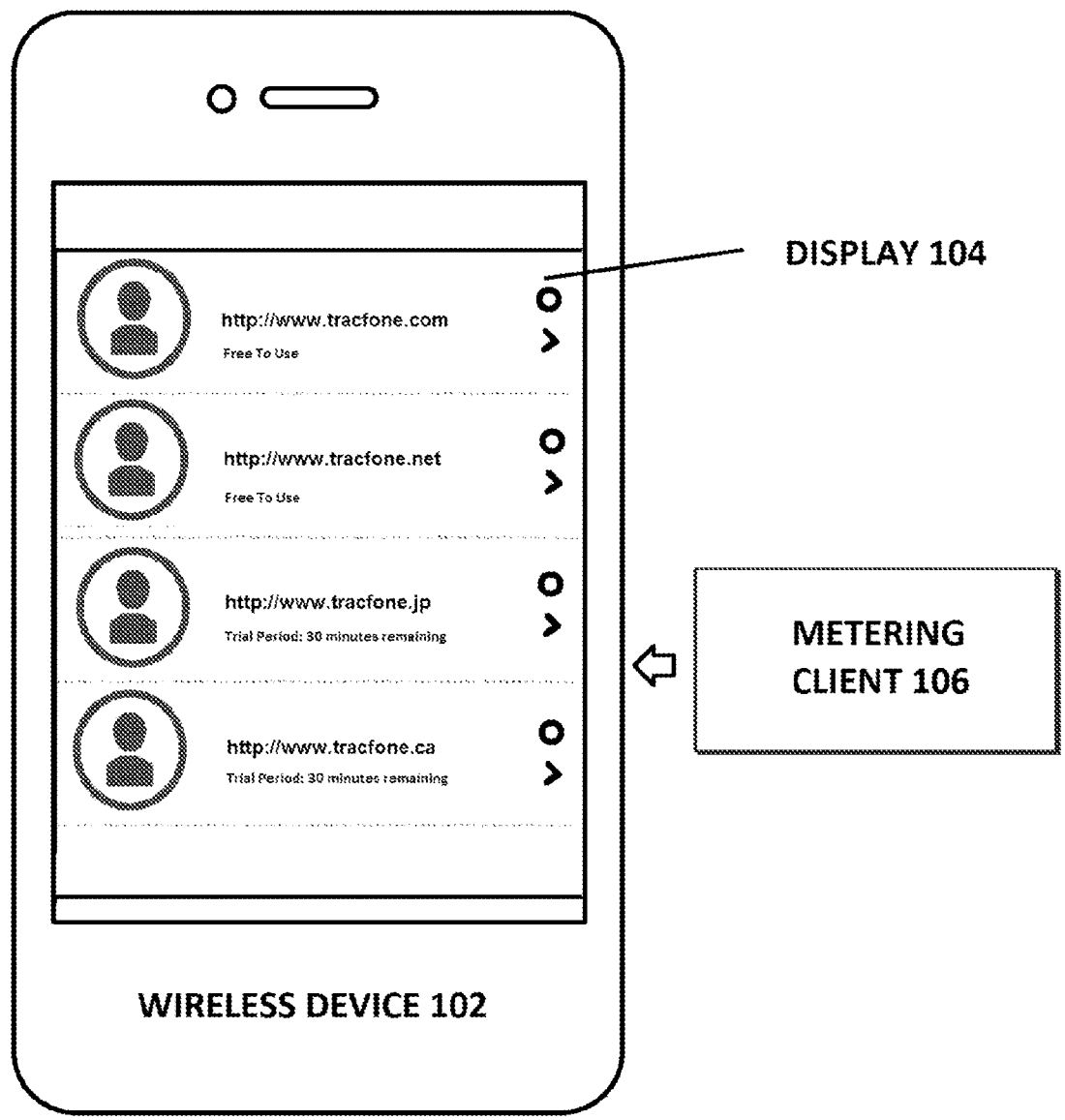
FIG. 5 shows a wireless device display in accordance with aspects of the invention.

FIG. 5 shows a wireless device display with in accordance with aspects of the invention. In an aspect of the invention, the metering client 106 may provide a display 104 of free-to-use, trial period, and/or reduced data cost web resources on the wireless device 102. The display 104 of web resources with specialized metering parameters may be a list of domains, web addresses, wireless device applications, or other web resources. The display 104 of web resources may also indicate the specialized metering parameter that corresponds to each entry, such as free-to-use, trial period, reduced cost, or the like. The display 104 of web resources with specialized metering parameters may provide hyperlinks or other means of directing the wireless subscriber to the web resource.

In an aspect of the invention, the metering client 106 may provide a display of web resources with specialized metering parameters on the wireless device, such as web resources that are free-to-use, trial period, reduced cost, or the like. The display of web resources with specialized metering parameters may be a list of domains, web addresses, wireless device applications, or other web resources. The display of web resources with specialized metering parameters may provide hyperlinks or other means of directing the wireless subscriber to the web resource.

In another aspect of the invention, the metering client 106 may provide an indication to the wireless device 102 once the user leaves a web resource with specialized metering parameters. The metering client 106 may send a notification message in the form of a SMS, email, packet form, datagram, USSD message, or other form of communication to the wireless device. The metering client 106 may also provide an icon or popup on the display of the wireless device 102 that indicates a web resource is not a web resource with specialized metering parameters.

In another aspect of the invention, the metering client 106 may provide an indication to the wireless device 102 once a trial period has expired. The metering client 106 may send a notification message in the form of a SMS, email, packet form, datagram, USSD message, or other form of communication to the wireless device 102. The metering client 106 may also provide an icon or popup on the display 104 of the wireless device 102 that indicates a web resource is no longer within the trial period. The metering client 106 may also provide one or more notifications before the trial period expires to indicate the duration of the trial period remaining.

The foregoing process and system for implementing a wireless network provides the wireless network with the ability to selectively meter data usage by users differently based on the web site, server, or other web resource that a user accesses. The foregoing implementations provide a wireless network with the ability to drive user traffic to access desired websites for advertising, revenue, and the like.

Furthermore, some wireless device users may benefit from selective metering of data because it allows them an option to access a limited number of websites for a reduced cost. Furthermore, as the network operators may also have incentives to provide certain web resources, websites, or applications to their users free of cost or at a reduced cost, such implementations outlined in the preceding sections permit them to do so. The network operators also have the ability to drive traffic to specific web resources, websites, applications, or the like for advertising or because of contracts with the content providers.

For the purposes of this disclosure computer readable medium stores computer data, which can include computer program code that is executable by a processor of the SIM or mobile device, in machine readable form. By way of example, and not limitation, a computer readable medium may include computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and nonremovable storage media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage media, magnetic cassettes, magnetic tape disk storage or other magnetic storage devices, or any other physical or material medium which can be used to tangibly store the desired information or data or instructions and which can be accessed by a processor or computer device. In one or more aspects, the actions and/or events of a method, algorithm or module may reside as one or any combination or set of codes and/or instructions on a computer readable medium or machine readable medium, which may be incorporated into a computer program product.

In another aspect, the invention may be implemented in any type of mobile smartphones that are operated by any type of advanced mobile data processing and communication operating system, such as, e.g., an Apple iOS operating system, a Google Android operating system, a RIM Blackberry operating system, a Nokia Symbian operating system, a Microsoft Windows Mobile operating system, a Microsoft Window Phone operating system, a Linux operating system or the like.

Further in accordance with various aspects of the invention, the methods described herein are intended for operation with dedicated hardware implementations including, but not limited to PCs, PDAs, SIM cards, semiconductors, application specific integrated circuits (ASIC), programmable logic arrays, cloud computing devices, and other hardware devices constructed to implement the methods described herein.

The invention may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, a cellular telephone network, a Personal Communications Service (PCS), using known protocols such as the Global System for Mobile Communications (GSM), CDMA (Code-Division Multiple Access), W-CDMA (Wideband Code-Division Multiple Access), Wireless Fidelity (Wi-Fi), Bluetooth, Long Term Evolution (LTE), 5G (5th generation mobile networks/wireless systems), EVolution-Data Optimized (EVDO) and/or the like, and/or a combination of two or more thereof.

While the system and method have been described in terms of what are presently considered to be specific aspects, the disclosure need not be limited to the disclosed aspects. It is intended to cover various modifications and similar arrangements included within the spirit and scope of the claims, the scope of which should be accorded the broadest interpretation so as to encompass all such modifications and similar structures. The present disclosure includes any and all aspects of the following claims.

The invention claimed is:

1. A process of metering data usage in a wireless network implemented by a mobile network operator accessed by a wireless device comprising:

receiving a request for data usage of a web resource in the mobile network operator wireless network from the wireless device;

determining if the web resource corresponds to at least one entry in a database;

allowing access to the web resource in the mobile network operator wireless network by the wireless device;

tracking data usage of the web resource by the wireless device with a metering client; and metering data usage of the web resource by the wireless device with the metering client based on information contained in the database;

wherein metering data usage of the web resource by the wireless device further comprises altering metering data usage in the metering client with respect to a user's plan if the database indicates the web resource is associated with specialized metering parameters; and wherein the process of determining if the web resource corresponds to an entry in the database further comprises comparing a web resource identification information with the entry.

2. The process of metering data usage of a wireless device of claim 1, wherein the metering client is implemented in the mobile network operator wireless network;

wherein the process of receiving the request for data usage by the wireless device further comprises determining web resource identification information in the mobile network operator wireless network; and wherein the web resource identification information includes at least one of an IPv4 address, an IPv6 address, at least one part of a domain name address, a Uniform Resource Identifier (URI), a Uniform Resource Locator (URL), and a server associated with the web resource.

3. The process of metering data usage of a wireless device of claim 1, wherein the process of tracking data usage of the web resource by the wireless device further comprises tracking the amount of data with the metering client that is sent or received by a wireless device, the length of time the web resource is used, and the date and time of the data usage of the web resource; and wherein the process of tracking data usage of the web resource by the wireless device further comprises characterizing with the metering client the data usage into categories that comprises at least one of free-to-use, trial period, reduced cost, web page, video streaming, audio streaming, and wireless device application.

4. The process of metering data usage of a wireless device of claim 1, wherein the process of tracking data usage of the web resource by the wireless device further comprises providing notification to a wireless device received from the mobile network operator wireless network that a web resource is no longer a free-to-use, trial period, or reduced cost web resource.

5. The process of metering data usage of a wireless device of claim 1, wherein the process of metering data usage by the wireless device further comprises displaying database information on a display of a wireless device received from the mobile network operator wireless network that a particular web resource is associated with specialized metering parameters; and wherein the specialized metering parameters comprise at least one of free-to-use, trial period, and reduced cost metering parameters.

6. The process of metering data usage of a wireless device of claim 1,
wherein the specialized metering parameters comprise at least one of free-to-use, trial period, and reduced cost metering parameters; and
wherein the database entries can be in the form of URIs, URLs, domain names, IP addresses, APIs, or other protocols.

7. A wireless network system implemented by a mobile network operator, the wireless network system configured to meter data usage of a wireless device comprising:
a metering system comprising a metering client, the metering system configured to receive a request for data usage of a web resource in the mobile network operator wireless network by the wireless device;
the metering system further configured to determine if the web resource corresponds to at least one entry in a database;
the metering system further configured to allow access to the web resource by the wireless device;
the metering system further configured to track data usage of the web resource by the wireless device with the metering client;
the metering system further configured to meter data usage with the metering client of the web resource by the wireless device based on information contained in the database; and
the metering system further configured to alter metering of data usage with the metering client with respect to a user's plan if the database indicates the web resource is associated with specialized metering parameters,
wherein the specialized metering parameters comprise at least one of free-to-use, trial period, and reduced cost metering parameters.

8. The wireless network system configured to meter data usage of a wireless device of claim 7, wherein the metering system is configured to track data usage of the web resource by the wireless device further comprises characterizing with the metering client the data usage into categories that comprises at least one of free-to-use, trial period, reduced cost, web page, video streaming, audio streaming, and wireless device application.

9. A non-transitory computer-readable medium including instructions that are configured to cause a computing system in a wireless network implemented by a mobile network operator to meter data usage by a wireless device, comprising:
receiving a request for data usage of a web resource in the mobile network operator wireless network from the wireless device;
determining if the web resource corresponds to at least one entry in a database;
allowing access to the web resource in the mobile network operator wireless network by the wireless device;
tracking data usage of the web resource by the wireless device with a metering client; and
metering data usage of the web resource with the metering client based on information contained in the database,
wherein metering data usage of the web resource by the wireless device based on information contained in the database further comprises altering metering data usage in the metering client with respect to a user's plan if the database indicates the web resource is associated with specialized metering parameters; and
wherein the determining if the web resource corresponds to an entry in the database further comprises comparing a web resource identification information with the entry.

10. The non-transitory computer-readable medium according to claim 9, further comprising instructions for receiving the request for data usage by the wireless device further comprises determining web resource identification information,
wherein the web resource identification information includes at least one of an IPv4 address, an IPv6 address, at least one part of a domain name address, a Uniform Resource Identifier (URI), a Uniform Resource Locator (URL), and a server associated with the web resource.

11. The non-transitory computer-readable medium according to claim 9, further comprising instructions for tracking data usage of the web resource by the wireless device further comprises tracking the amount of data with the metering client that is sent or received by a wireless device, the length of time the web resource is used, and the date and time of the data usage of the web resource.

12. The non-transitory computer-readable medium according to claim 9, further comprising instructions for tracking data usage of the web resource with the metering client by the wireless device further comprises characterizing with the metering client the data usage into categories that comprise at least one of free-to-use, trial period, reduced cost, web page, video streaming, audio streaming, and wireless device application.

13. The non-transitory computer-readable medium according to claim 9, further comprising instructions for tracking data usage of the web resource by the wireless further comprises providing notification to a wireless device received from the mobile network operator wireless network that a web resource is no longer a free-to-use, trial period, or reduced cost web resource.

14. The non-transitory computer-readable medium according to claim 9,
wherein the specialized metering parameters comprise at least one of free-to-use, trial period, and reduced cost metering parameters; and
wherein the database entries can be in the form of URIs, URLs, domain names, IP addresses, APIs, or other protocols.

15. The process of metering data usage of a wireless device of claim 1,
wherein the process of metering data usage by the wireless device further comprises displaying an indication on a display of the wireless device received from the mobile network operator wireless network when the wireless device requests a web resource after requesting a particular web resource associated with specialized metering parameters; and
wherein the specialized metering parameters comprise at least one of free-to-use, trial period, and reduced cost metering parameters.

16. The process of metering data usage of a wireless device of claim 1,
wherein the metering client is implemented in the wireless device; and
wherein the process of receiving the request for data usage by the wireless device further comprises determining web resource identification information in the wireless device.

17. The process of metering data usage of a wireless device of claim 1, further comprising:

generating a report listing each requested web resource that corresponds to at least one entry in the database; and providing the report to at least one of the following: the mobile network operator wireless network and a mobile virtual network operator.

18. The wireless network system configured to meter data usage of a wireless device of claim 7, wherein the metering system is configured to generate a report listing each requested web resource that corresponds to at least one entry in the database; and wherein the metering system is configured to provide the report to at least one of the following: the mobile network operator wireless network and a mobile virtual network operator.

19. The non-transitory computer-readable medium according to claim 9, wherein the metering data usage by the wireless device further comprises displaying database information on a display of a wireless device received from the mobile network operator wireless network that a particular web resource is associated with specialized metering parameters; and wherein the specialized metering parameters comprise at least one of free-to-use, trial period, and reduced cost metering parameters.

20. The non-transitory computer-readable medium according to claim 9, further comprising:

generating a report listing each requested web resource that corresponds to at least one entry in the database; and providing the report to at least one of the following: the mobile network operator wireless network and a mobile virtual network operator.

* * * * *